UNITED STATES PATENT OFFICE.

NELSON ORCUTT, OF BINGHAMTON, NEW YORK.

IMPROVEMENT IN COMPOSITIONS FOR SOAP.

Specification forming part of Letters Patent No. 25,668, dated October 4, 1859.

*To all whom it may concern:*

Be it known that I, NELSON ORCUTT, of Binghamton, in the county of Broome and State of New York, have invented certain new and useful Improvements in Making Soap; and I do hereby declare the following to be a full, clear, and exact description of the same.

In carrying out my invention I use the following-named articles in the quantity and proportions stated: one hundred pounds of sal-soda or thirty-three and one-third pounds of soda-ash put in twenty-three gallons of boiling water for forming the lye; twenty pounds of stone-lime put in twenty gallons of water; one hundred pounds of untried or unrendered tallow or crude grease; fifty pounds of resin, and one pound of alum. The stone-lime which I have used is known in the market as "Binghamton" lime and "Glens Falls" lime. Having put the sal-soda or soda-ash in the twenty-three gallons of boiling water and the stone-lime in the twenty gallons of water, I then put in the kettle the tallow or grease, resin, and alum. Upon these last-named articles in the kettle I gradually pour the lye of the sal-soda or soda-ash, and lastly I add the lime and water and expose the contents of the kettle to the necessary degree of heat and for the time required to convert the mass into soap. By combining the body of the lime with the sal-soda or soda-ash I produce a better result than when used otherwise.

Having thus fully set out my invention, what I claim as new, and desire to secure by Letters Patent, is—

Making soap from untried or unrendered tallow or grease and the other ingredients herein named, the ingredients being in the proportions herein stated.

This specification signed at Binghamton this 20th day of July, 1859.

NELSON ORCUTT.

Witnesses:
MOSES E. CONKLIN,
E. CASTLE.